United States Patent [19]

Johnston et al.

[11] Patent Number: 4,832,411

[45] Date of Patent: May 23, 1989

[54] METHOD AND APPARATUS FOR CUTTING REINFORCED CONCRETE

[76] Inventors: Edward P. Johnston, 15 Meghan Cove, Winnipeg, Manitoba, Canada, R2G 3E3; John D. Johnston, 73 Werrell Crescent, Winnipeg, Manitoba, Canada, R2K 3Y2

[21] Appl. No.: 151,970

[22] Filed: Feb. 3, 1988

[51] Int. Cl.$^4$ .......................... B28D 1/08; F21C 25/20
[52] U.S. Cl. ......................................... 299/15; 125/21; 299/35
[58] Field of Search ...................... 299/15, 35; 175/89, 175/90; 125/12, 21; 474/110, 113; 254/390, 389, 394

[56] References Cited

U.S. PATENT DOCUMENTS

| | | | |
|---|---|---|---|
| 558,483 | 4/1896 | Clark | 299/15 X |
| 2,050,761 | 8/1936 | Newson | 299/15 |
| 2,577,545 | 12/1951 | Stratton | 299/35 |
| 4,674,474 | 6/1987 | Baril | 725/21 |
| 4,735,188 | 4/1988 | Kubo | 299/35 X |

FOREIGN PATENT DOCUMENTS 834921 9/1938 France .................................. 299/35

Primary Examiner—Stephen J. Novosad
Assistant Examiner—David J. Bagnell
Attorney, Agent, or Firm—Robert W. B. Bailey

[57] ABSTRACT

The invention relates to a method of cutting an interior surface in reinforced concrete. Holes are drilled to define the shape of the concrete (usually a rectangular block) to be removed, these can be drilled to any suitable depth, which was not possible under prior art methods. Slots are cut between the holes except at one side using an endless wire saw. An interior cut is made using the endless wire saw from the periphery to the uncut side. The wire saw is secured in the cutting operations at the interior end of the holes by swivel pulleys secured at the exterior end of the holes to the concrete surface. The invention also relates to a swivel pulley assembly especially adapted for application in the method. The invention further relates to a method of cutting a substrate by allowing the wire saw to cut between two pulleys interior of the substrate, from a nonlinear path between the pulleys to a line connecting the pulleys.

16 Claims, 4 Drawing Sheets

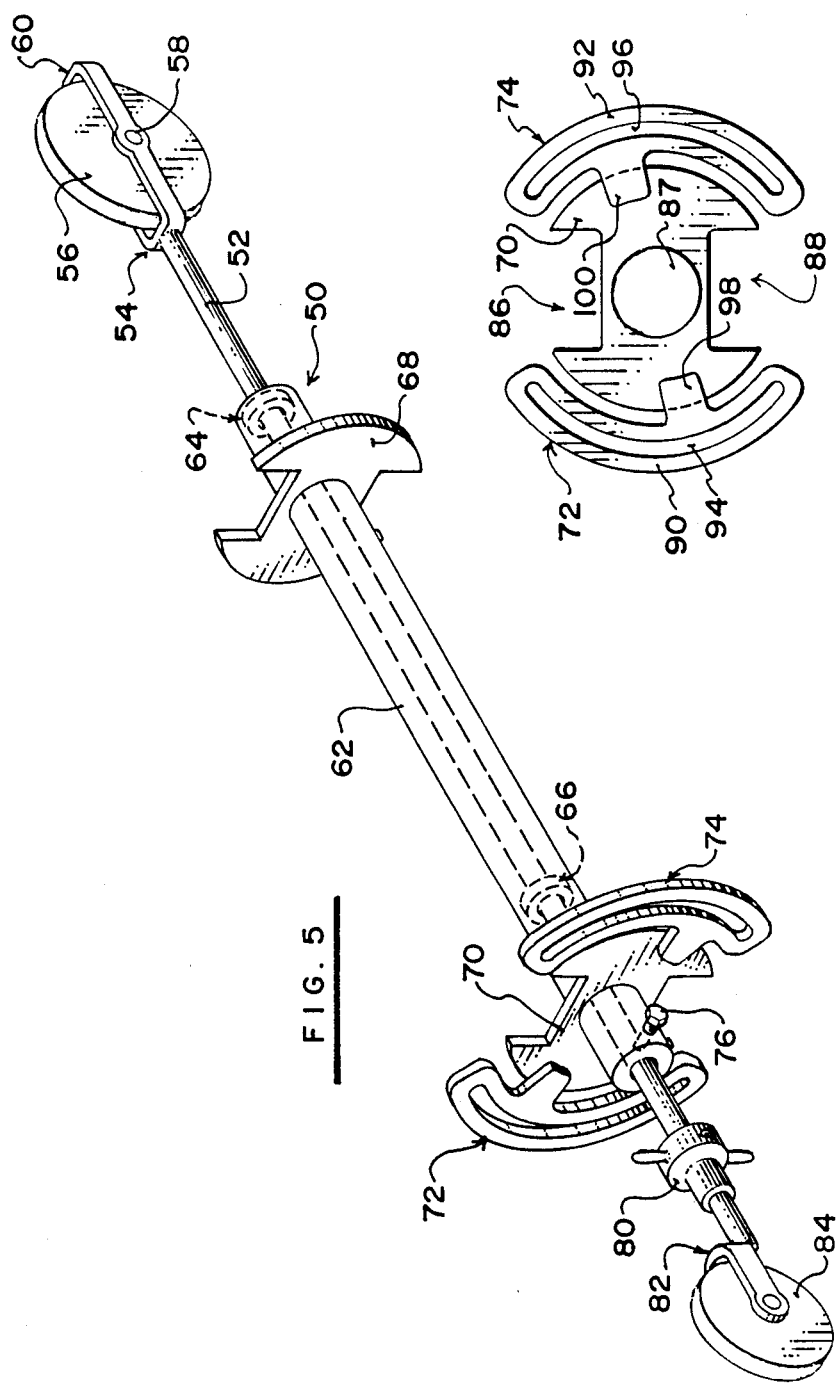

METHOD AND APPARATUS FOR CUTTING REINFORCED CONCRETE

This invention relates to cutting of concrete, rock and similar material. Particularly it relates to a novel method of cutting a surface in concrete. More particularly it relates to cutting of an interior surface of reinforced concrete. The invention in one broadest aspect relates to a method of cutting a surface of reinforced concrete, in another broadest aspect relates to a method of cutting an interior surface of reinforced concrete, and in another broadest aspect to a device adapted to enable cutting of an interior surface of reinforced concrete. As is readily comprehended by those skilled in the art the cutting of a surface of reinforced concrete can also be applied to an interior of rock, unreinforced concrete and the like.

It is often necessary to cut a cube or similar shaped block of reinforced concrete out of the surface of a state of the art dam or similar concrete structure to repair damage or for other purposes. Under currently known technology, this can only be carried out under certain limited conditions, as typically the concrete is reinforced by steel or metal of similar properties, this further limits the conditions of possible success.

DESCRIPTION OF THE PRIOR ART

In practice the only method of which applicants are aware is cutting into the block from the surface with saws, especially circular saws, which are satisfactory to cut up to about 15 inches (40 cms) deep from the exterior surface of the concrete, but which are not satisfactory for deeper cutting.

Applicants use known abrasive wires in the practice of the invention, and such wires are currently available.

SUMMARY OF THE INVENTION

In a broadest aspect the invention relates to an improvement in a method of cutting a cavity in an exterior surface of a substrate, the cavity forming a substantially right polygonal prism, having a polygonal aperture in the exterior surface of the substrate, and a polygonal interior surface spaced apart from and substantially parallel to the polygonal aperture, and substantially rectangular surfaces substantially perpendicular to the exterior surface of the substrate, extending from the aperture to the interior surface and forming sides of the prism, the improvement comprising cutting the polygonal interior surface by a wire saw extending peripherally around the prism. In preferred form the said wire saw is secured by pulleys at two adjacent vertices of the interior polygonal surface, whereby the wire saw cuts the interior polygonal surface for the periphery of the prism to a line connecting the adjacent vertices. This arrangement allows cutting of the interior surface of the prism, which was previously unknown as far as applicants are aware. Endless wire saw belts driven by a machine are utilized in the invention.

In another related aspect the invention relates to a method of cutting a cavity in an exterior surface of a reinforced concrete substrate, the cavity forming a substantially right polygonal prism, having a polygonal aperture in the exterior surface of the substrate, and a polygonal interior surface spaced apart from and substantially parallel to the polygonal aperture, and substantially rectangular surfaces substantially perpendicular to the exterior surface of the substrate, extending from the aperture to the interior surface and forming sides of the prism, comprising in a first step drilling holes substantially perpendicular to the exterior surface of substantially equal depth to form vertices of the polygonal aperture, in a second step cutting peripheral rectangular slots connecting the holes between all the vertices except one pair, in a third step cutting the polygonal interior surface by a diamond impregnated wire saw extending peripherally around the prism, in a fourth step cutting a rectangular slot between the last two vertices. The drilling of the holes enables the interior surface to be cut at theoretically any depth from the surface, and in practice at depths greater than is currently possible, thus allowing deeper cavities to be cut than by conventional methods.

Preferably in the third step the diamond impregnated wire saw is secured by pulleys at two adjacent vertices of the interior polygonal surface, whereby the wire saw cuts the interior polygonal surface from the periphery of the prism to a line connecting the adjacent vertices.

Preferably in the second step each peripheral rectangular slot is cut by a diamond impregnated wire saw, secured by pulleys at two vertices of the interior polygonal surface adjacent the rectangular peripheral slot, the wire saw extending from one of the interior surface vertex to an equivalent exterior surface vertex across the substrate to another exterior vertex equivalent the other interior surface vertex, then extending from the another exterior vertex to the other interior surface vertex, whereby the wire saw cuts from the exterior surface to a line joining the adjacent interior vertices. This in effect allows the wire saw to be used in a similar fashion to a cheese wire cutting from the exterior of the slot to the level of the interior surface. In a preferred method in the fourth step the diamond impregnated wire extends from an exterior surface vertex, equivalent to one last interior vertex, to the one last interior vertex, along the line connecting the last two interior vertices to the other last interior vertex, then from the other last interior vertex to an equivalent exterior surface vertex, whereby the wire saw cuts a rectangular slot from the line connecting the last two interior vertices to the exterior surface. The wire saw cuts the last slot form inside the cavity outward to the surface.

Generally the polygonal prism in a rectangular block, and the holes are at the exterior corners of the rectangular block. Often the exterior substrate surface is substantially vertical and two rectangular slots forming sides of the rectangular block are substantially horizontal. When this is so, it is convenient in the second step to cut the two horizontal rectangular slots first, and one vertical slot second, and in the third step the interior rectangular surface is cut by a diamond impregnated wire saw extending from a first pulley in a first interior corner horizontally along a first slot an adjacent second interior corner, then vertically along a second slot to an adjacent third interior corner, then horizontally along a third slot to a second pulley in an adjacent fourth interior corner, which is vertically displaced from the first interior corner, whereby the wire saw cuts the interior surface from the second slot to a line joining the first and fourth vertices. The saw moves horizontally (side to side) across the block in these circumstances. Applicants have found that cutting the interior surface in other ways is less satisfactory, the direction of cutting the interior surface (the back cut) is determined by the order of cutting the slots to the interior surface. If the cutting direction is upwards, compression, inadequate slurry removal, build up of concrete fines, and water tending to drain off the wire, allowing the wire saw to approach white heat, all tend to present problems. If the cutting direction is downward, the difficulties are more to cutting the last slot, which is subject to compression by the cut block falling onto the wire as it cuts horizontally outward (or inward). Thus a side to side cutting direction is preferred. This means that the last (outward) cut preferably forms a side slot. Under this approach in the second step the lower of the horizontal rectangular slots is cut first, which minimizes possible compression on the wire by the block.

Applicants have found that a diamond impregnated wire saw is the only effective readily available tool to carry out these cutting operations, when the cavity is being cut in reinforced concrete. Applicants have found tungsten carbide impregnated wire saws are not effective in cutting reinforced concrete. The wire saw preferred by applicants for use in the practice of the invention is comprised of a wire core bearing diamond impregnated beads (short metal tube, having diamond impregnated on the outside) separated by spacers, springs and stay clips. Other wire saw types can be utilized in various embodiments of the invention cutting rock, and unreinforced concrete.

In another broad aspect the invention is a swivel pulley assembly for wire saws adapted for circular holes in a substrate, comprising a shaft having an interior end and an exterior end, a pulley mounted on the interior end of the shaft, support means for the shaft, means to secure the support means to a surface of the substrate exterior of the hole, means to engage the shaft releasably to the support means, whereby the shaft is radially adjustable with respect to the support means and the surface exterior of the hole. Preferably this support means comprises a sleeve, having inner and outer ends, mounted around the shaft. Conveniently the sleeve comprises first and second radial spacer means, each spacer means having a periphery adapted to fit the circular hole, a central aperture adapted to fit the sleeve, and opposed paired wire guide spaces, the first spacer means being mounted adjacent the inner end of the sleeve, the second spacer means being mounted adjacent the outer end of the sleeve, the means to secure the support means to a surface of the substrate exterior of the hole being mounted on the second spacer means, the wire guide spaces of the first and second spacer means being aligned with respect to the sleeve, whereby the aligned wire guide spaces provide passage for the wire saw. Preferably the spacer means are plates, with wire guide spaces extending inward from the periphery, the means to secure the support means to a surface exterior of the hole comprises anchor means attached the second spacer plate by connecting means. More preferably the anchor means comprises paired opposed anchor plates substantially concentric to the spacer plate having concentric slots adapted to receive anchor bolts, the anchor plates having integral connecting means extending inward and attached to the surface of the second spacer, whereby when the anchor plates abut the substrate surface, the second spacer plate is recessed within the hole. The sleeve may additionally comprise rider bearings for the shaft, and the means to engage the shaft releasably to the support means may comprise a locking pin mounted in the sleeve and engaging the shaft. The shaft may be extendible and additionally may comprise a second exterior pulley mounted thereon aligned with the interior pulley. The interior end of the shaft may have a fork assembly for mounting the interior pulley, which may comprise opposed spaced apart members connected to the interior end of the shaft, the members extending beyond the pulley, and include bearings for the pulley, the members being joined by a terminal end cap, whereby the pulley and saw wire do not contact the substrate axially of the shaft.

In another broadest related aspect the invention is a method of cutting a surface in a substrate with a wire saw comprising securing said wire saw at two points within the substrate, the wire saw forming a nonlinear path between the points and allowing the wire saw to abrade the substrate whereby the wire saw cuts a surface from the nonlinear path to a line connecting the points. Preferably the wire saw is secured by pulleys at the two points, each of the pulleys being held in position by a shaft having an end interior of the substrate mounting the pulley, and an end exterior of the substrate anchored to the substrate.

DESCRIPTION OF PREFERRED EMBODIMENTS

Preferred embodiments are indicated in the drawings where:

FIG. 5 illustrates a pulley swivel system of the invention.

FIG. 6 illustrates a view of a preferred form of the combined exterior anchor and spacer plates.

Figure 1:
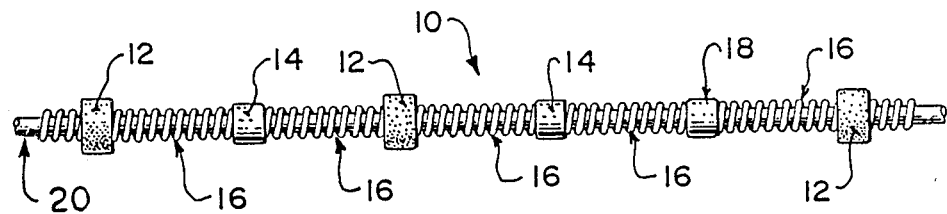
FIG. 1 illustrates a diamond impregnated wire saw utilized in the invention.
Figure 2:
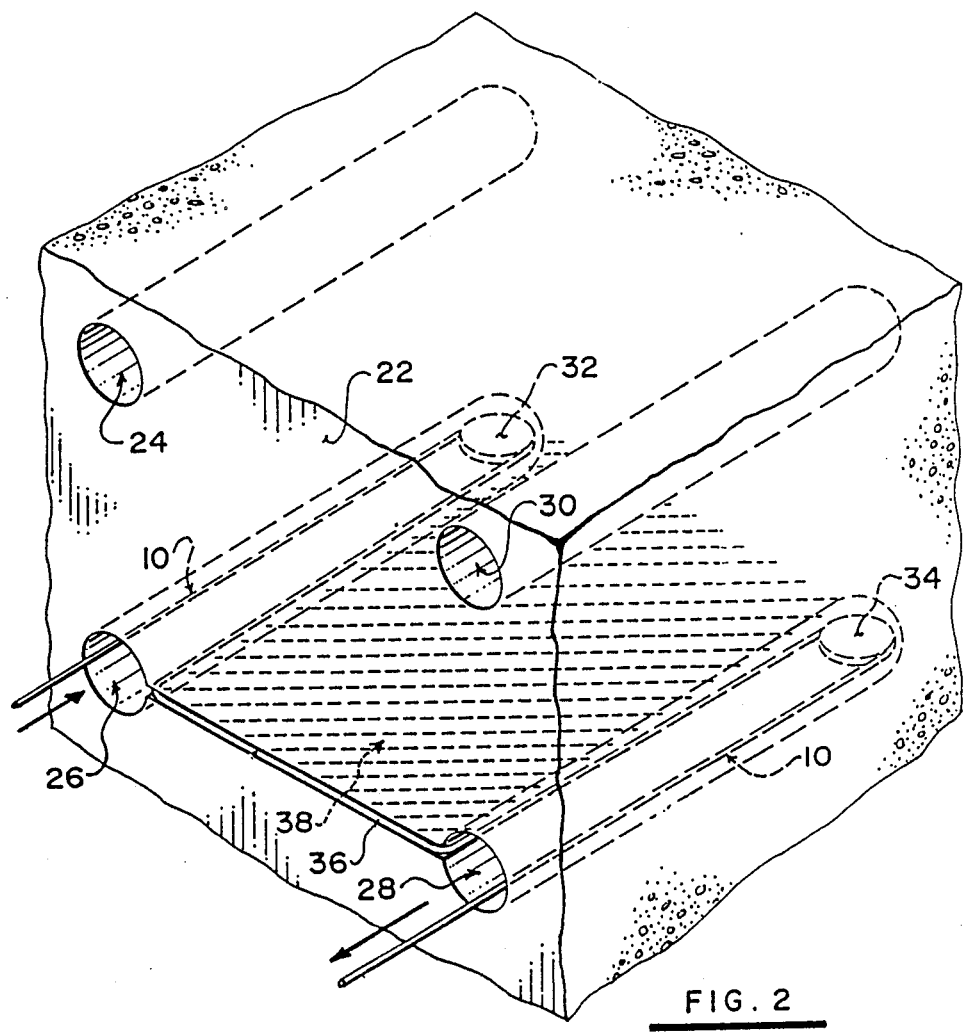
FIG. 2 illustrates a step of the method of the invention.
Figure 3:
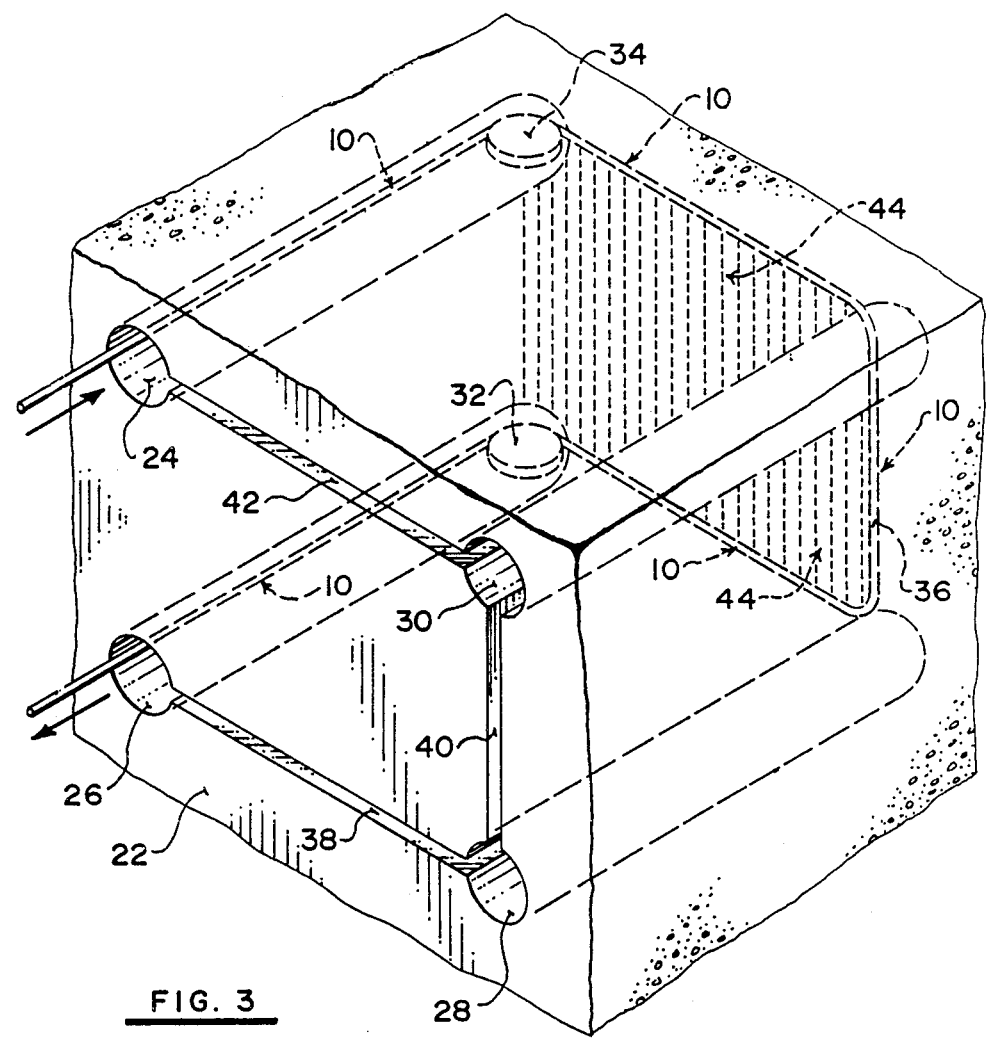
FIG. 3 illustrates another step of the method of the invention.

In FIG. 1, numeral 10 generally indicates a detail of wire saw utilized in the invention, having diamond impregnated beads 12 separated from spacers 14 by springs 16, every so often stay clips 18 are present to maintain the array in relative position on wire 20. FIG. 2 shows initial development of a preferred embodiment of the method, holes 24, 26, 28, 30 are drilled into horizontally into substantially vertical substrate surface 22. Wire 10, is passed into hole 26 to pulley 32, passed back to surface 22, then across to hole 28 down to pulley 34 there out (pulley securing means are not indicated for clarity). The wire saw is an endless wire driven by a machine, cutting surface 36 of saw 10 cuts slot 38 indicated by shading. In FIG. 3 slots 38, 40, 42, have been cut as indicated, pulleys 32 and 34 are in holes 26, and 24 respectively, wire 10 is passed in hole 24 around pulley 34 along slots 42, 40, 38 around pulley 32 then out, cutting edge 36 of saw 10 cuts interior surface 44 indicated by shading.

Figure 4:
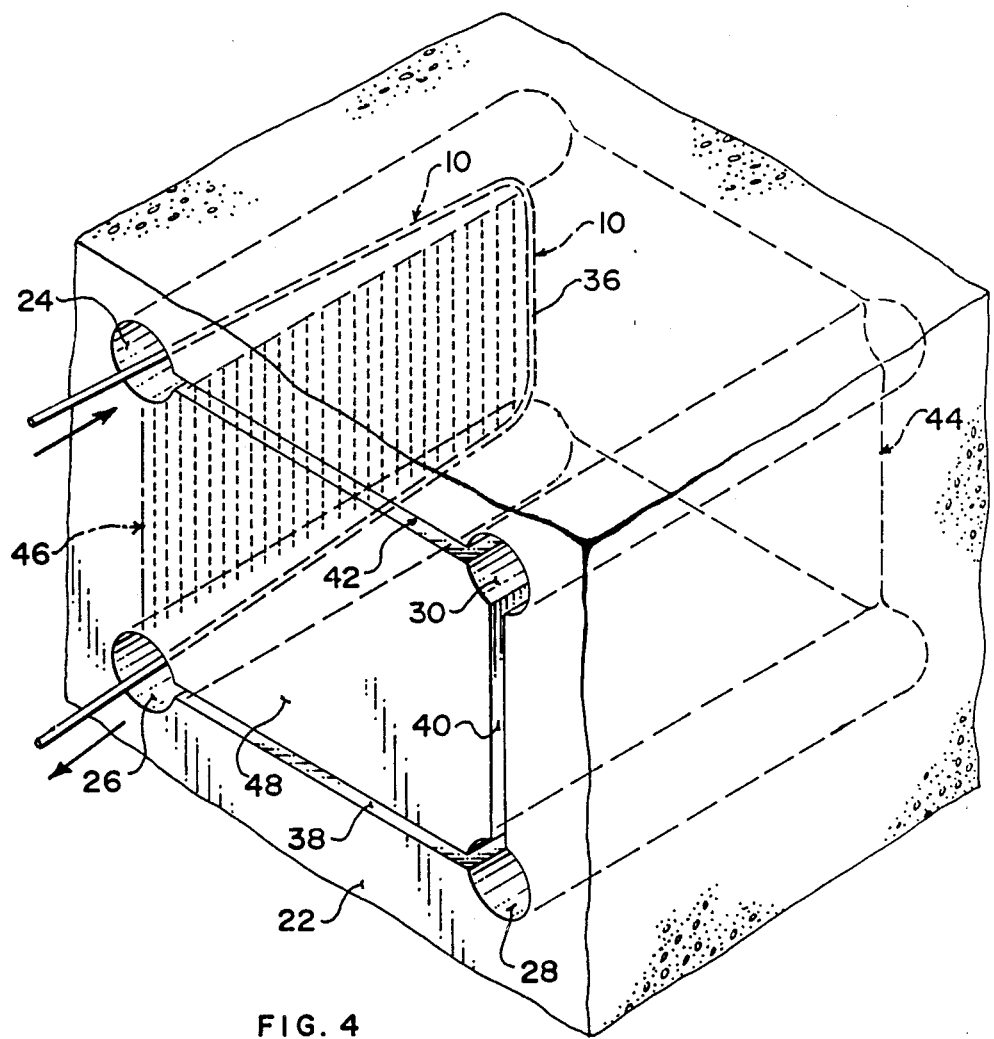
FIG. 4 illustrates variant of another step of the method of the invention.

FIG. 4 indicates the last cutting step after cutting interior surface 44, wire saw 10 lies along hole 24, edge of interior surface 44 and hole 26, saw 10 is then used to cut slot 46 indicated by shading. While this cut could be made in the equivalent fashion by a wire saw from the surface inward using pulleys mounted within the holes, applicants found cutting outward was more convenient, as otherwise the wire saw has to be fished out and reinserted in the holes. After this slot is cut cube or block 48 is removed from substrate 22 leaving a cavity.

FIG. 5 indicates in perspective, with some interior details the swivel pulley assembly indicated generally by numeral 50. Extendible shaft 52, comprised of threaded tube elements, has interior fork assembly 54, mounting pulley 56, at bearing 58, fork assembly 54 terminates at end cap 60, enabling the saw wire and pulley to avoid contact with the interior face of the hole. Sleeve 62 mounts shaft 52 by rider bearings 64 and 66. Interior spacer plates 68 and exterior spacer plate 70, preferably of 1 inch, (2.5 cm) thick steel, are directly mounted on sleeve 62. Paired anchor plates 72 and 74 are mounted on exterior plate 70. Locking pin 76, passes through sleeve 62 to engage shaft 52. Adjusting handle 80 allows rotation of shaft 52, with respect to sleeve 62, when locking pin 76 is released. Exterior fork assembly 82, bears exterior pulley 84.

FIG. 6, indicates a preferred form of the anchor spacer plate arrangement, spacer plate 70 has a central aperture 87 and opposed peripheral wire guide spaces 86, 88, anchor plates generally denoted by numerals 72, 74 have an outer arc like plates 90, 92 having an arc like slots 94, 96, integral connectors 98, 100 allow connection to spacer plate 70. In a preferred embodiment the spacer plate conveniently has a diameter of 6 inches (15 cm), the anchor plate outer perimeter conveniently has a diameter of 8 inches (20 cm).

In use, bolts are passed through anchor plates 72, and 74, in slots 94 and 96, thus securing the assembly to the substrate surface with spacer 70 recessed into the hole mouth. The wire saw passes down (or up) the hole to pulley 56 beyond which it cuts the substrate. When it is desired to change direction of the saw cut, locking pin 76 is released and shaft 52 bearing aligned pulleys is rotated through a desired angle, and locking pin 76 is retightened. In practice applicants have found that the preferred arrangement is satisfactory for most cutting purposes.

Although this invention is described in terms of specific embodiments, it is not limited thereto, as would be understood by those skilled in the art, numerous variations are possible within the scope of the invention, without departing from the spirit and nature thereof.

We claim:

1. A swivel pulley assembly for wire saws adapted for circular holes in a substrate, comprising a shaft having an interior end and an exterior end, a pulley mounted on said interior end of said shaft, support means for said shaft, means to secure said support means to a surface of said substrate exterior of said hole, means to engage said shaft releasably to said support means, whereby said shaft is radially adjustable with respect to said support means and said surface exterior of said hole.

2. The assembly of claim 1, wherein said support means comprises a sleeve, having inner and outer ends, mounted around said shaft.

3. The assembly of claim 2, wherein said sleeve comprises first and second radial spacer means, each spacer means having a periphery adapted to fit said circular hole, a central aperture adapted to fit said sleeve, and opposed paired wire guide spaces, said first spacer means being mounted adjacent said inner end of said sleeve, said second spacer means being mounted adjacent said outer end of said sleeve, said means to secure said support means to a surface of said substrate exterior of said hole being mounted on said second spacer means, said wire guide spaces of said first and second spacer means being aligned with respect to said sleeve, whereby said aligned wire guide spaces provide passage for said wire saw.

4. The assembly of claim 3, wherein said spacer means are plates, and said wire guide spaces extend inward from said periphery, said means to secure said support means to a surface exterior of said hole comprises anchor means attached said second spacer plate by connecting means.

5. The assembly of claim 4, wherein said anchor means comprises paired opposed anchor plates substantially concentric to said spacer plate having concentric slots adapted to receive anchor bolts, said anchor plates having integral connecting means extending inward and attached to the surface of said second spacer, whereby when said anchor plates abut said substrate surface said second spacer plate is recessed within said hole.

6. The assembly of claim 5, wherein said sleeve additionally comprises rider bearings for said shaft, and said means to engage said shaft releasably to said support means comprises a locking pin mounted in said sleeve and engaging said shaft.

7. The assembly of claim 6, wherein said shaft is extendible and additionally comprises a second exterior 8. The assembly of claim 7, wherein said interior end of said shaft has a fork assembly for mounting said interior pulley, said fork assembly comprising opposed spaced apart members connected to the interior end of said shaft, said members extending beyond said pulley, said members including bearings for said pulley, said members being joined by a terminal end cap, whereby said pulley and saw wire do not contact said substrate axially of said shaft.

9. A method of cutting a cavity in an exterior surface of substrate selected from rock or reinforced concrete said cavity forming a substantially right polygonal prism, having a polygonal aperture in said exterior surface of said substrate, and a polygonal interior surface spaced apart from and substantially parallel to said polygonal aperture, and substantially rectangular surfaces substantially perpendicular to said exterior surface of said substrate, extending from said aperture to said interior surface and forming sides of said prism, comprising in a first step drilling holes substantially perpendicular to said exterior surface of substantially equal depth to form vertices of said polygonal aperture, in a second step cutting peripheral rectangular slots connecting said holes between all said vertices except one pair by a diamond impregnated wire saw, in a third step cutting said polygonal interior surface by a diamond impregnated wire saw extending peripherally around said prism, in a fourth step cutting a rectangular slot between the last two vertices by a diamond impregnated wire saw.

10. The method of claim 9, wherein in said third step said diamond impregnated wire saw is secured by pulleys at two adjacent vertices of said interior polygonal surface, whereby said diamond impregnated wire saw cuts said interior polygonal surface from the periphery of the prism to a line connecting said adjacent vertices.

11. The method of claim 10, wherein in said second step each peripheral rectangular slot is cut by a diamond impregnated wire saw, secured by pulleys at two vertices of said interior polygonal surface adjacent said rectangular peripheral slot, said wire saw extending from one said interior surface vertex to an equivalent exterior surface vertex across said substrate to another exterior vertex equivalent said other interior surface vertex, then extending from said another exterior vertex to said other interior surface vertex, whereby said wire saw cuts from said exterior surface to a line joining said adjacent interior vertices.

12. The method of claim 11, wherein in said fourth step said diamond impregnated wire extends from an exterior surface vertex, equivalent to one last interior vertex, to said one last interior vertex, along the line connecting said last two interior vertices to the other last interior vertex, then from said other last interior vertex to an equivalent exterior surface vertex, whereby said wire saw cuts a rectangular slot from said line connecting said last two interior vertices to said exterior surface.

13. The method of claim 9, wherein said polygonal prism is a rectangular block, and said holes are at the exterior corners of said rectangular block.

14. The method of claim 9, wherein in said exterior substrate surface is substantially vertical and two rectangular slots forming sides of said rectangular block are substantially horizontal.

15. The method of claim 14, wherein in said second step said two horizontal rectangular slots are cut first, and one vertical slot is cut second, and in said third step the interior rectangular surface is cut by a diamond impregnated wire saw extending from a first pulley in a first interior corner horizontally along a first slot to an adjacent second interior corner, then vertically along a second slot to an adjacent third interior corner, then horizontally along a third slot to a second pulley in an adjacent fourth interior corner, which is vertically displaced from said first interior corner, whereby said wire saw cuts said interior surface from said second slot to a line joining said first and fourth vertices.

16. The method of claim 15, wherein in said second step the lower of said horizontal rectangular slots is cut first.

* * * * *